United States Patent [19]

Roger et al.

[11] Patent Number: 4,775,191
[45] Date of Patent: Oct. 4, 1988

[54] HYDRAULIC BRAKE SYSTEM FOR RAIL VEHICLES

[75] Inventors: Michel Roger, Chaville; Serge Dufour, Noiseau, both of France; Jan-Ola Harstrom, Landskrona, Sweden

[73] Assignees: Regie Autonome Des Transports Parisiens, Paris; Sab Nife, Saint-Cloud, both of France

[21] Appl. No.: 86,228

[22] Filed: Aug. 10, 1987

Related U.S. Application Data

[63] Continuation of Ser. No. 856,441, Apr. 22, 1986, abandoned.

[30] Foreign Application Priority Data

Apr. 22, 1985 [FR] France ................................. 85 06047

[51] Int. Cl.$^4$ ............................................. B60T 8/18
[52] U.S. Cl. .................................. 303/9.76; 303/9.69; 303/22.1
[58] Field of Search ............. 188/170, 195; 303/22 R, 303/23 R, 6 M, 15

[56] References Cited

U.S. PATENT DOCUMENTS

| | | | |
|---|---|---|---|
| 2,330,739 | 11/1940 | Piron | 188/170 |
| 3,178,238 | 4/1965 | Dean | 303/22 R |
| 3,881,785 | 5/1975 | Pollinger | 303/22 R |
| 4,093,316 | 6/1978 | Reinecke | 303/22 R X |
| 4,181,368 | 1/1980 | Strom | 303/15 |
| 4,307,916 | 12/1981 | Straut et al. | 303/15 X |
| 4,575,159 | 3/1986 | Emilsson | 303/6 M X |

FOREIGN PATENT DOCUMENTS

| | | | |
|---|---|---|---|
| 2015799 | 10/1971 | Fed. Rep. of Germany | 303/22 R |
| 2140781 | 2/1972 | Fed. Rep. of Germany | |
| 2210532 | 7/1974 | France | |
| 1090599 | 5/1984 | U.S.S.R. | 303/22 R |
| 1587405 | 4/1981 | United Kingdom | |

Primary Examiner—George E. A. Halvosa
Attorney, Agent, or Firm—Sheridan Neimark; A. Fred Starobin

[57] ABSTRACT

A hydraulic brake system for vehicles, particularly light rail vehicles, includes at least one brake actuator for engaging the brake by means of a group of springs and disengaging the brake by hydraulic pressure. The system comprises an electric drive motor and pump for supplying pressurized hydraulic fluid to the actuator, and a safety valve and solenoid valves for controlling the pressure of the hydraulic fluid in the actuator. An accumulator is connected to the electric drive motor and pump for delivering the pressurized hydraulic fluid via valves and restriction for adjusting the pressure in the accumulator to a value substantially inversely proportional to the load of the vehicle. It is connected to the actuator by shuttle valves controlled by the pressure of the accumulator when the control safety valve and solenoid valves are actuated to relieve hydraulic fluid from the actuator.

6 Claims, 1 Drawing Sheet

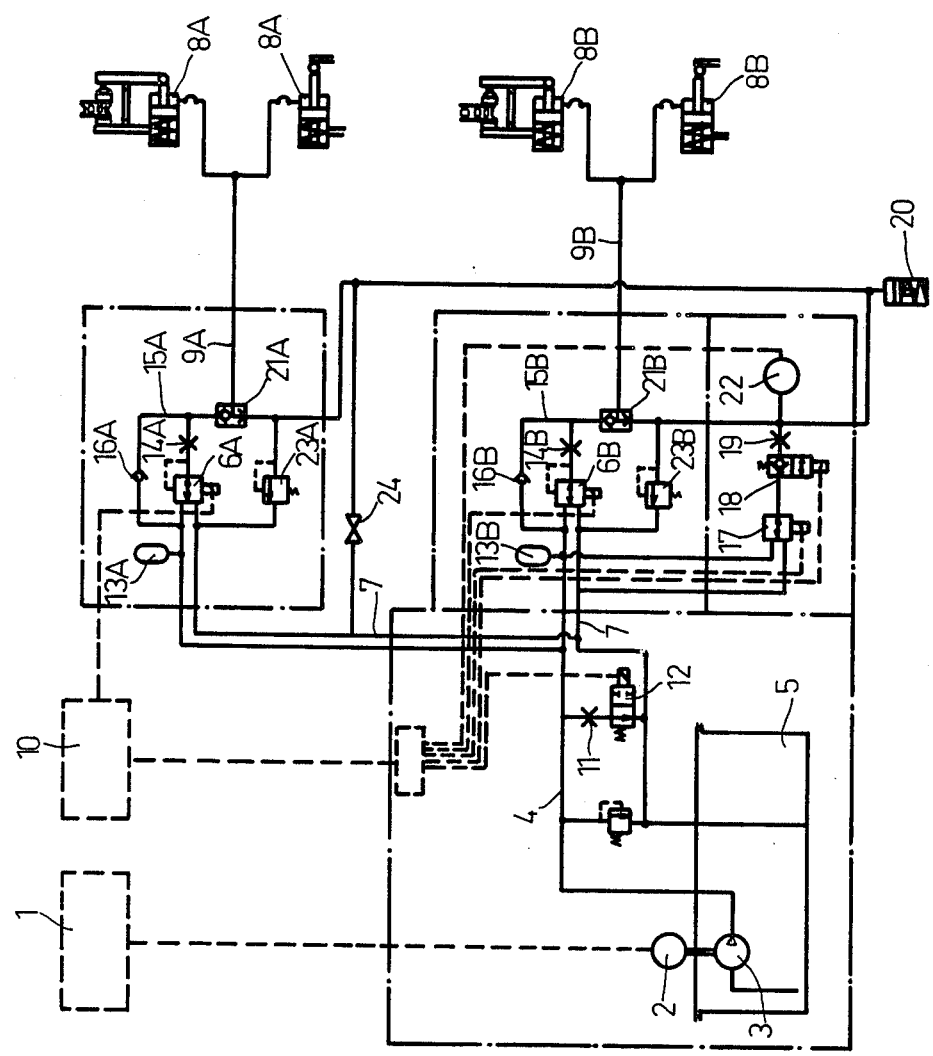

HYDRAULIC BRAKE SYSTEM FOR RAIL VEHICLES

This application is a continuation of application Ser. No. 856,441, filed Apr. 22, 1986, now abandoned.

TECHNICAL FIELD

The invention relates to a hydraulic brake system for vehicles, particularly light rail vehicles, such as trams, including at least one brake actuator for engaging the brake by means of a group of spring and disengaging the brake by hydraulic pressure, means for supplying pressurized hydraulic fluid to the actuator, and control means for relieving hydraulic fluid from the actuator.

BACKGROUND ART

A brake system of this type is described in the published European patent No. 089081.

In one mode of emergency braking, when said brake system is being used, the hydraulic fluid received by the actuator in order to disengage the brake is suddenly emptied from the actuator in order to engage the brake. As a consequence therefore the vehicle may be abruptly braked, which may not be desired or even necessary under the circumstances. It is possible to control brake effect by means of a suitable microcomputer provided that electrical energy is available for such control, but in many cases the emergency braking is effected due to a shutdown of the electric power, the possibility of automatically controlling the brake effect thus being eliminated.

DISCLOSURE OF THE INVENTION

The purpose of the invention is to provide a brake system for vehicles of the type referred to above, wherein the brake effect in emergency braking will be controlled in relation to the load of the vehicle even in cases when no electric power is available for the normal control of the brake effect.

For said purpose the invention provides a hydraulic brake system for vehicles of the type referred to above which is characterized by a pressure accumulator connected to said means for supplying pressurized hydraulic fluid and responsive to the load of the vehicle to maintain a pressure which at any time is substantially inversely proportional to said load and means for controlling the pressure of said accumulator for maintaining in the actuator a pressure which substantially equals said pressure when said control means are actuated to relieve hydraulic fluid from the actuator.

BRIEF DESCRIPTION OF THE DRAWING

The invention will be described in more detail below with reference to the accompanying drawing, which discloses a detailed circuit diagram of one embodiment of an electro-hydraulic brake system of the invention.

DESCRIPTION OF THE PREFERRED EMBODIMENT

An electronic unit 1 is operatively connected to an electric drive motor 2 which is connected to a pump 3. The pump conveys hydraulic fluid through a conduit 4 from a tank 5 for such fluid to two solenoid valves 6A and 6B of the pressure regulating valve type having a return connection 7 to the tank 5.

When the solenoid is de-energized no hydraulic fluid is supplied from the valve. However, a small pilot flow is allowed to pass through the valve to the conduit 7 when the valve is de-energized, said pilot flow being necessary for the operation of the valve. The valve 6A is arranged for brake actuators 8A on a first bogie of the vehicle, whereas the other valve 6B is arranged for brake actuators 8B on a second bogie of the vehicle, said actuators comprising disk brake calipers of the type which is spring-applied and hydraulically released and of a design known per se, the connection between the valve 6A and the actuators 8A and the valve 6B and the actuators 8B, respectively, being provided by a conduit 9A and 9B, respectively.

The solenoid of each valve is electrically connected to a controller 10 which can be operated manually, for example by means of a control level.

The pump 3 is driven by the motor 2 controlled by the electronic unit 1 so as to provide a constant hydraulic pressure. The hydraulic pressure supplied by each solenoid valve 6A and 6B is controlled by the controller 10 by adjustment of the current through the solenoid of the related valve, according to braking requirements.

From the conduit 4 a connection is established to the return conduit 7, communicating with the tank 5 via a restriction 11 and a safety valve 12 of the solenoid type, said valve being open when de-energized. The solenoid is therefore connected to the controller 10 to be energized in normal operation to close the valve.

Two accumulators 13A and 13B are connected to the conduit 4 at the respective inlets of valves 6A and 6B. They are advantageously hydropneumatic accumulators.

In the outlet conduit 9A and 9B, respectively, there is provided a restriction 14A and 14B, respectively. The conduit 9A and 9B, respectively, is connected to the conduit 4 downstream of the restriction by a shunt 15A and 15B, respectively. A check valve 16A and 16B, respectively, on said shunt allows fluid to pass from the conduit 9A and 9B, respectively, to the conduit 4 but preventing fluid flow in the opposite direction.

For further details of the hydraulic brake system so far described reference is made to the European patent mentioned above.

Different operational conditions of the hydraulic brake system have been described in said patent. The brake force is controlled by supplying pressurized hydraulic fluid under the control of the valves 6A and 6B. In one mode of emergency braking the hydraulic brake system is de-energized, the safety valve 12 establishing a connection between conduits 4 and 7 (the condition of the valve 12 shown in the drawing), and the check valves 16A and 16B connecting the actuators with the tank.

Under these circumstances, maximum brake force is applied by the actuators 8A and 8B via the springs and the vehicle will be abruptly braked, particularly if the load of the vehicle is low.

The arrangement of the invention eliminates this drawback by providing a brake force which is adjusted to the load of the vehicle.

To this end, a solenoid valve 17 fed by the conduit 4 and connected to the return conduit 7 is controlled by the controller 10 so as to maintain at its outlet a hydraulic pressure which is inversely proportional to the load of the vehicle.

A valve 18 connects the outlet from the valve 17 to the accumulator 20 via the restriction 19 on power up. It interrupts the connection on power down in order to prevent fluid flowing from the accumulator 20 into the tank 5 through the valve 17.

The purpose of the restriction 19 is to attenuate oscillations in the hydraulic brake system when the accumulator 20 is being filled and to allow closure of the valve 18 before any significant amount of hydraulic fluid has been allowed to pass from the accumulator on emergency braking.

The accumulator 20 is connected to the conduits 9A and 9B, respectively, by shuttle valves 21A and 21B, respectively.

The shuttle valves 21A and 21B, respectively, are controlled by the predominating pressure delivered either by the valves 6A and 6B, respectively, or by the accumulator 20. On emergency braking electrical control of the hydraulic braking system is de-energized and the pressure delivered by the valves 6A and 6B falls off. The pressure in the accumulator 20 then maintains in the actuators 8A and 8B a braking force adjusted to the instanteous load of the vehicle.

As soon as an electrical signal appears at the valves 6A and 6B, respectively, the actuators 8A and 8B, respectively, are again fed at the pressure delivered by valves 6A and 6B, respectively, via the shuttle valves 21A and 21B, respectively.

A pressure sensor 22 is connected to the accumulator 20 for indication and measuring purposes but may also be used to control valves 17 and 18 of other type than that used in the embodiment shown and described herein.

Between the accumulator 20 and the conduit 7 valves 23A and 23B, respectively, are arranged in parallel with the valves 6A and 21A and the valves 6B and 21B, respectively.

These valves 23A and 23B are pressure limiting valves preventing the pressure from rising over a predetermined maximum value. When such value is reached, the valves open to connect the accumulator directly to the conduit 7 and thus to the tank 5.

When maintenance work or repair has to be performed, it is necessary for safety reasons to relieve the hydraulic pressure on the system before any work is performed. This can be done by means of a valve 24 connecting the accumulator directly with the conduit 7 and thus with the tank. The valve 24 must be operated manually but may also comprise a restriction which empties the accumulator 20 over a predetermined period, for example 15 minutes, if no hydraulic fluid is being supplied via the valve 17 to the accumulator.

We claim:

1. A hydraulic brake system for vehicles, such as light rail vehicles, comprising
   a brake including at least one brake actuator (8A,8B) for engaging said brake by means of a group of springs and disengaging said brake by hydraulic pressure;
   braking control means (12,6A,6B) for controlling said hydraulic pressure in said actuator, having inputs connected to means (2,3) for supplying pressurized fluid and also connected to a tank (5);
   means (16A,16B) for connecting an outlet of said braking control means (6A,6B) to said tank when the brake system is de-energized;
   a pressure accumulator (20);
   means (17) for adjusting a fluid pressure in said accumulator to a value substantially inversely proportional to a present load of the vehicle, through which said accumulator is connected to said means (2,3) for supplying pressurized hydraulic fluid and to said tank (5);
   means (18) for preventing fluid flowing from the accumulator into said tank when the brake system is de-energized;
   circuit selector means (21A,21B) through which said brake actuator (8A,8B) is connected to one of either said braking control means (6A,6B) or said accumulator (20) delivering a predominating pressure, said brake actuator switched by said circuit selector means to said accumulator when the pressure in said brake actuator which decreases because of its connection with said tank at an outlet of said braking control means becomes lower than the pressure in said accumulator;
   wherein during de-energizing of the brake system the hydraulic pressure in said brake actuator is at least equal to the pressure in said accumulator which is kept to a value substantially inversely proportional to the load of the vehicle.

2. The hydraulic brake system according to claim 1 wherein
   said means (17) for adjusting a fluid pressure in said accumulator is a pressure regulator valve (17);
   a controller (10) which produces a signal representing the load of the vehicle controls said pressure regulator valve (17);
   said pressure accumulator (20) is connected to said means (2,3) for supplying pressurized fluid and to said tank (5) via said pressure regulator valve (17) controlled by said controller (10).

3. The hydraulic brake system according to claim 2 wherein
   an externally controlled shut-off valve (18) connects said pressure regulator valve (17) to said accumulator (20).

4. The hydraulic brake system according to claim 1 wherein
   said circuit selector means comprises a hydraulic shuttle valve (21A,21B).

5. The hydraulic brake system according to claim 1 wherein
   a maximum pressure release valve (23A,23B) is connected to said accumulator (20).

6. The hydraulic brake system according to claim 1 wherein
   a valve (24) is connected to said accumulator (20) for emptying hydraulic fluid therefrom

* * * * *